(12) United States Patent
Wang et al.

(10) Patent No.: US 9,610,799 B2
(45) Date of Patent: Apr. 4, 2017

(54) HOUSING FOR ELECTROIC DEVICE AND METHOD FOR MAKING SAME

(71) Applicants: SHENZHEN FUTAIHONG PRECISION INDUSTRY CO., LTD., Shenzhen (CN); FIH (HONG KONG) LIMITED, Kowloon (HK)

(72) Inventors: Yu-Tsai Wang, New Taipei (TW); Ying-Bo Yang, Shenzhen (CN); Shui-Ying Chen, Shenzhen (CN); Bi-Ling Dong, Shenzhen (CN)

(73) Assignees: SHENZHEN FUTAIHONG PRECISION INDUSTRY CO., LTD., Shenzhen (CN); FIH (HONG KONG) LIMITED, Kowloon (HK)

( * ) Notice: Subject to any disclaimer, the term of this patent is extended or adjusted under 35 U.S.C. 154(b) by 0 days.

(21) Appl. No.: 14/806,286

(22) Filed: Jul. 22, 2015

(65) Prior Publication Data

US 2016/0311249 A1  Oct. 27, 2016

(30) Foreign Application Priority Data

Apr. 24, 2015  (CN) .......................... 2015 1 0199459

(51) Int. Cl.
| | |
|---|---|
| *H04M 1/00* | (2006.01) |
| *B44F 1/08* | (2006.01) |
| *B05D 3/06* | (2006.01) |
| *B05D 3/02* | (2006.01) |
| *H04M 1/02* | (2006.01) |

(52) U.S. Cl.
CPC .............. *B44F 1/08* (2013.01); *B05D 3/0254* (2013.01); *B05D 3/065* (2013.01); *H04M 1/0202* (2013.01)

(58) Field of Classification Search
USPC .............................................. 45/575.1, 550.1
See application file for complete search history.

(56) References Cited

U.S. PATENT DOCUMENTS

| | | | | |
|---|---|---|---|---|
| 5,673,028 | A * | 9/1997 | Levy ....................... | G01D 7/005 116/209 |
| 6,564,742 | B2 * | 5/2003 | Perner .................... | G01K 11/06 116/216 |
| 6,608,996 | B1 * | 8/2003 | Laurikka ............. | H04M 1/0279 340/7.55 |
| 7,513,682 | B2 * | 4/2009 | McClure ................ | G01K 11/12 252/408.1 |
| 8,914,047 | B1 * | 12/2014 | Tyler ..................... | H04W 40/20 455/456.1 |
| 9,020,443 | B1 * | 4/2015 | Tyler .................... | H04B 17/318 455/115.4 |
| 2005/0001728 | A1 * | 1/2005 | Appelt ................. | G08B 21/182 340/573.1 |
| 2009/0286579 | A1 * | 11/2009 | Warnick .................. | H04M 1/18 455/575.1 |
| 2014/0191873 | A1 * | 7/2014 | Kreiner ............. | H04M 1/72569 340/604 |

* cited by examiner

*Primary Examiner* — Fayyaz Alam
(74) *Attorney, Agent, or Firm* — Zhigang Ma

(57) ABSTRACT

A housing includes a base defining at least one receiving cavity and at least one embedding member corresponding to the at least one receiving cavity. The at least one embedding member is embedded into the at least one receiving cavity. The at least one embedding member includes a pattern layer formed on the ceramic body. The pattern layer includes at least one pattern having a color. The least one pattern changes the color thereof according to changes of temperature.

10 Claims, 5 Drawing Sheets

HOUSING FOR ELECTROIC DEVICE AND METHOD FOR MAKING SAME

FIELD

The subject matter herein generally relates to housings for electronic devices, and particularly to a housing capable of indicating a temperature of the electronic device and a method for making the housing.

BACKGROUND

Nowadays, electronic devices such as mobile phones, personal digital assistants, or panel computers are widely in everyday life. However, batteries inside the electronic devices may overheat if the electronic devices continuously work for a long time. Users in the using process tend to ignore this even if the batteries reach a warning temperature, which may greatly reduce the useful life of the electronic devices.

BRIEF DESCRIPTION OF THE FIGURES

Implementations of the present technology will now be described, by way of example only, with reference to the attached figures.

DETAILED DESCRIPTION

Figure 1:
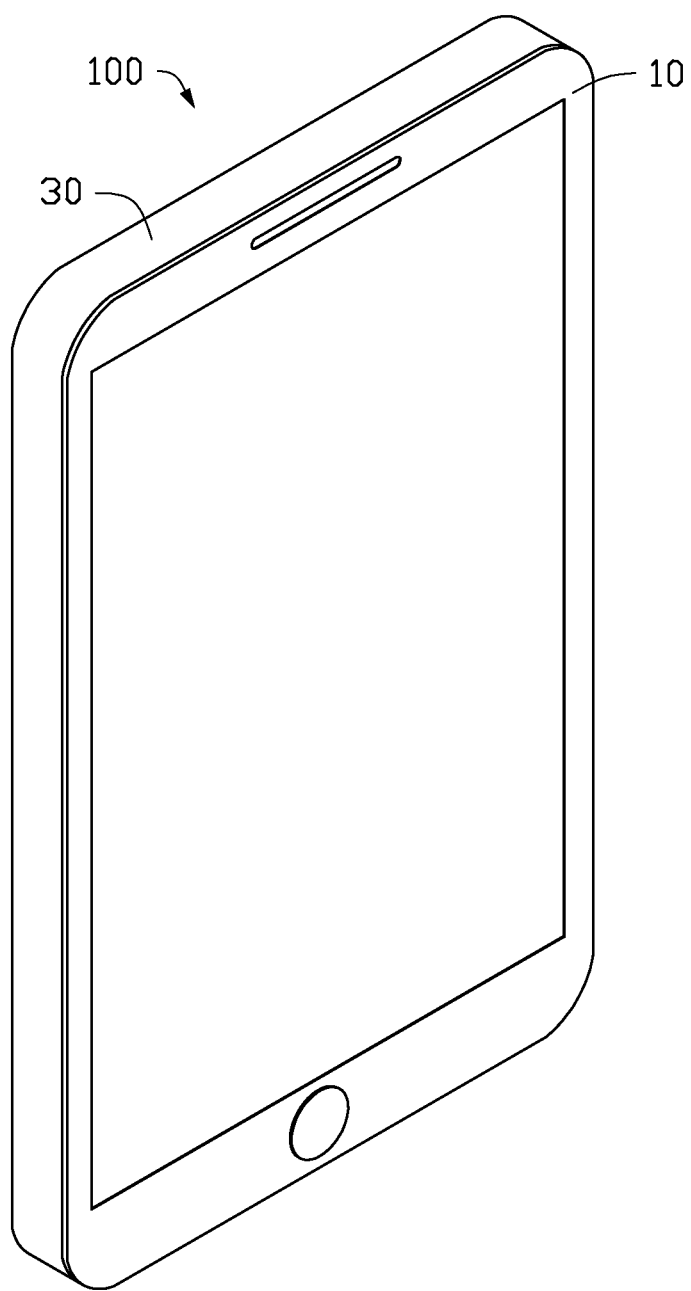
FIG. 1 is an isometric view of an electronic device, according to a first exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series and the like. The term "coupled" when utilized, means "either a direct electrical connection between the things that are connected, or an indirect connection through one or more passive or active intermediary devices, but not necessarily limited to".

Figure 2:
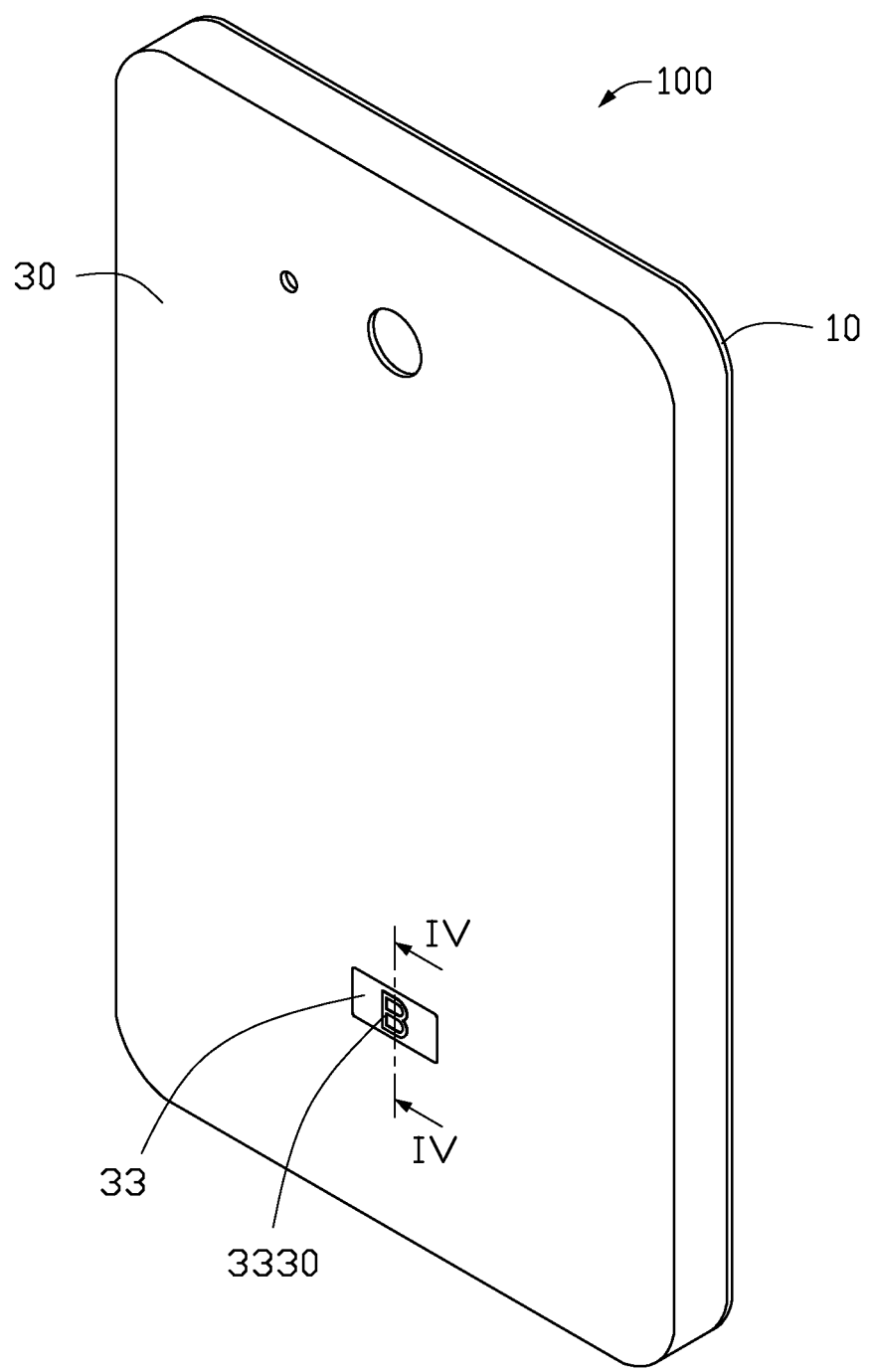
FIG. 2 is similar to FIG. 1, but showing the electronic device of FIG. 1 from another angle.

FIGS. 1 and 2 illustrate that an isometric view of an electronic device 100, according to a first exemplary embodiment. The electronic device 100 can be, but not limited to, a mobile phone, a personal digital assistant, or a panel computer. In this exemplary embodiment, the electronic device 100 is a mobile phone, for example. The electronic device 100 includes a window portion 10 and a housing 30. The window portion 10 and the housing 30 are assembled together.

Figure 3:
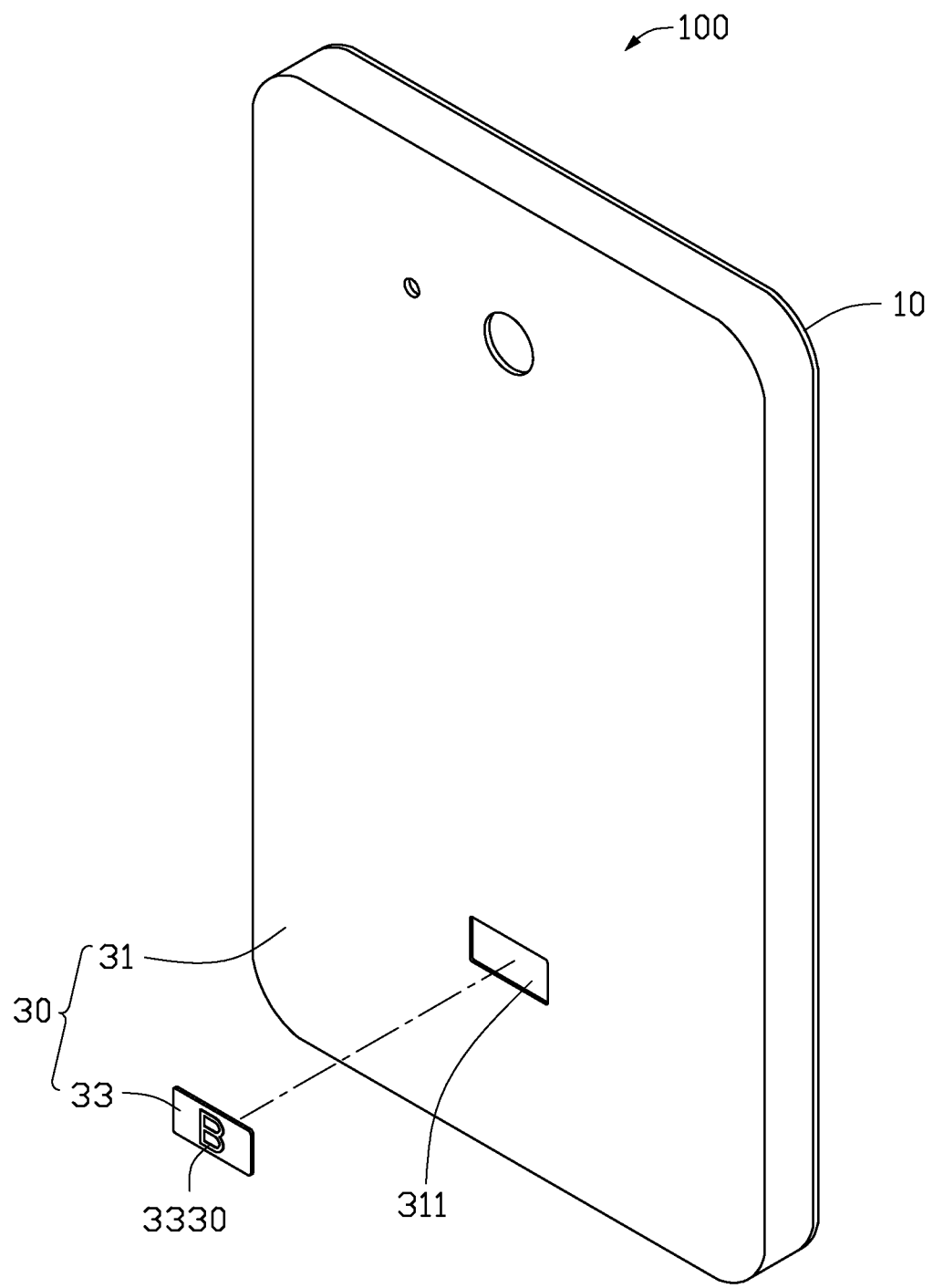
FIG. 3 is an exploded view of the electronic device of FIG. 1.

FIG. 3 illustrates that the housing 30 includes a base 31 and at least one embedding member 33.

The base 31 can be made of plastic or metal. At least one receiving cavity 311 is defined in the base 31 corresponding to the at least one embedding member 33 and configured for receiving the embedding member 33. In the illustrated embodiment, the housing 30 includes one embedding member 33, accordingly, the base 31 defined one corresponding receiving cavity 311. A shape of the receiving cavity 311 can be adjusted according to that of the embedding member 33.

Figure 4:
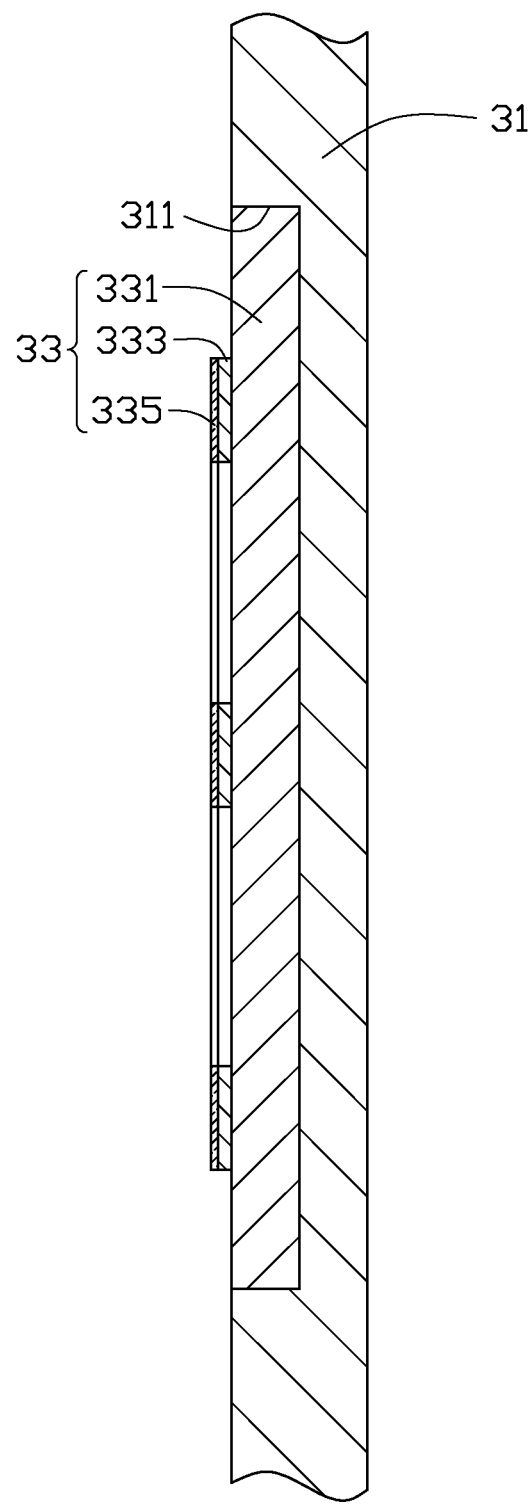
FIG. 4 is a cross-sectional view of electronic device along line IV-IV of FIG. 2.

FIG. 4 illustrates that the embedding member 33 includes a ceramic body 331, a pattern layer 333 formed on a surface of the ceramic body 331, and a protective film 335 formed on a surface of the pattern layer 333.

The ceramic body 331 is made of ceramic material. A shape of the ceramic body 331 can be adjusted according to requirements. In this exemplary embodiment, the ceramic body 331 is substantially rectangular.

The pattern layer 333 includes at least one pattern 3330. In this exemplary embodiment, the pattern layer 333 includes one pattern 3330. The pattern 3330 is substantially B-shaped. The pattern 3330 is made of thermo-sensitive ink material. The pattern 3330 changes a color thereof according to changes of temperature thereof. A temperature range in which the color of the pattern 3330 can be changed is about −15-70° C. The temperature range can be divided into multiple temperature sections. The pattern 3330 appears different colors corresponding to the temperature sections. A thickness of the pattern 3330 is about 0.01-0.02 mm.

The protective film 335 is directly formed on the surface of the pattern layer 333. The protective film 335 is formed by transparent or translucent UV type curing ink so that the pattern layer 333 cannot be easily destroyed and the pattern layer 333 can obtain a better stereo appearance effect.

In other exemplary embodiment, the protective film 335 can be also formed on other surface of the ceramic body 331 not covered by the embedding member 33 so that the ceramic body 331 can obtain a smooth surface In addition, the window portion 10 can further include a pattern layer made of thermo-sensitive ink material so that the window portion can change a color thereof of according to the changes of the temperature.

Figure 5:
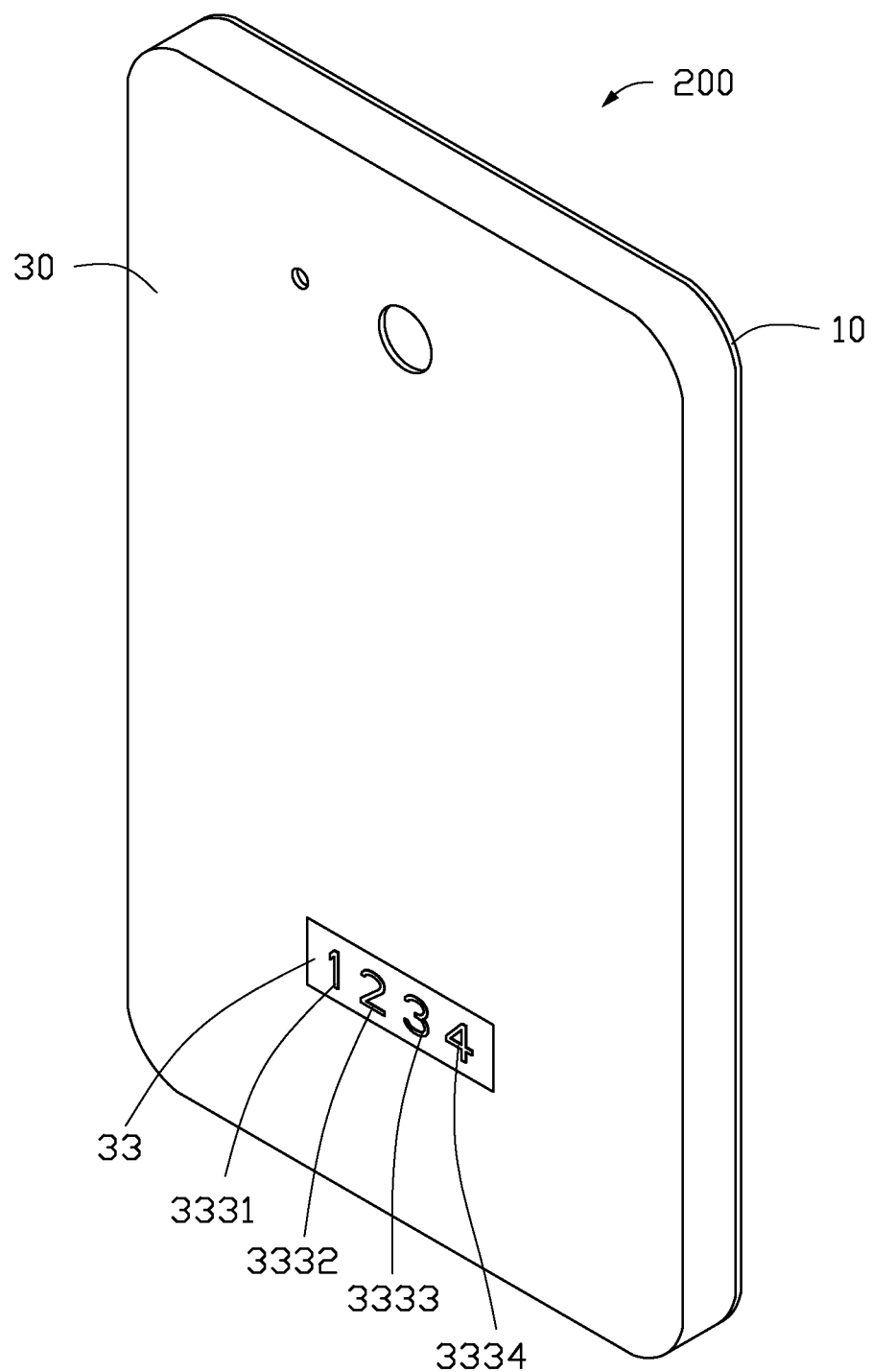
FIG. 5 is an isometric view of an electronic device, according to a second exemplary embodiment.

FIG. 5 illustrates that an isometric view of an electronic device 200, according to a second exemplary embodiment. A structure of the electronic device 200 is substantially similar to that of the electronic device 100. The difference is that the pattern layer 333 of the electronic device 200 includes a first pattern 3331, a second pattern 3332, a third pattern 3333, and a fourth pattern 3334. The first, second, third, and fourth pattern 3331, 3332, 3333, 3334 are different patterns and made of different thermo-sensitive ink materials configured for indicating different temperature sections. In this exemplary embodiment, the first pattern 3331 is substantially 1-shaped, the second pattern 3332 is substantially 2-shaped, the third pattern 3333 is substantially 3-shaped, the fourth pattern 3334 is substantially 4-shaped. The first pattern 3331 changes a color thereof corresponding to a first temperature section about 25-30° C., the second pattern 3332 changes a color thereof corresponding to a second temperature section about 30-40° C., the third pattern 3333 changes a color thereof corresponding to a third temperature section about 40-50° C., the fourth pattern 3334 changes a color thereof corresponding to a fourth temperature section about 50-60° C. Each temperature section corresponds to a different color which may be an original color of each pattern. Each pattern changes to a changed color from the original color and remains the changed color when the temperature is beyond the corresponding temperature section. Each pattern recoveries back to the original color from the changed color until the temperature dropped into the corresponding temperature section. As such, the pattern layer 333 appears the different patterns with the different colors corresponding to the different temperature sections.

In other exemplary embodiment, while forming the multiple patterns (e.g. the first, second, third, and fourth patterns 3331 to 3334) on the housing 33, the multiple embedding members 33 can be positioned in the base 31 corresponding to the patterns. Each pattern is formed on one of the embedding members 33.

An exemplary method for making the housing 10 of the electronic device 100 can include the following steps.

A ceramic body 331 is provided. The ceramic body 331 is formed by sintering a green body which is formed from powder by pressure forming. A shape of the ceramic body 331 can be adjusted according to requirements. In this exemplary embodiment, the ceramic body 331 is substantially rectangular.

A pattern layer 333 is formed on a surface of the ceramic body 331 by printing. In this exemplary embodiment, a layer of thermo-sensitive ink is formed on the surface of the ceramic body 331 by printing, wherein certain thermo-sensitive ink material is printed in an area in which a certain pattern need to be formed. The ceramic body 331 printed with the thermo-sensitive ink is baked so that the thermo-sensitive ink is solidified to form a thermo-sensitive ink layer. A pattern 3330 is formed by removing a portion of the solidified thermo-sensitive ink layer through laser engraving. Therefore, the pattern layer 333 is formed.

In this exemplary embodiment, the pattern 3330 appears different colors in different temperature sections. A temperature range in which the pattern 3330 changes the color thereof is about −15-70° C. The temperature range can be divided into the multiple temperature sections. The pattern 3330 appears the different colors corresponding to the temperature sections. A thickness of the pattern 3330 is about 0.01-0.02 mm. In other exemplary embodiment, the pattern 3330 can be directly formed by printing, the step of laser engraving can be omitted.

A protective film 335 is formed on a surface of the pattern layer 333. A layer of transparent or translucent UV type curing ink is sprayed on the surface of the pattern layer 333 by top coating. The UV type curing ink is solidified to form a layer of transparent or translucent protective film 335 under irradiation of UV light. The protective film 335 makes the pattern layer 333 obtain a better stereo appearance effect. As such, an embedding member 33 is formed.

In other embodiments, the protective film 335 can be also formed on other surface of the ceramic body 331 not covered by the embedding member 33 so that the ceramic body 331 can obtain a smooth surface The embedding member 33 and the base 31 are integrated together by injection molding. In this exemplary embodiment, the embedding member 33 is place in a mold. Molten plastic is injected into the mold by injection molding to form the base 31 integrated with the embedding member 33. Thus, the housing 30 of the electronic device 100 is formed. In this exemplary embodiment, the plastic can be Polycarbonate (PC).

In other exemplary embodiment, the base 31 can be metal. At least one receiving cavity 311 is defined in the base 31. The embedding member 33 is fixedly adhered into the receiving cavity 311 by glue so that the housing 30 of the electronic device 100 is formed.

In addition, the pattern layer 333 can be formed on the surface of the ceramic body 331 after the ceramic body 331 is integrated with the base 31.

Furthermore, the pattern layer 333 can be directly formed on the surface of the base 31 by In-Mold decoration (IMD).

An exemplary method for making the housing 10 of the electronic device 200 is substantially similar to that of the electronic device 100 therefore is not detailed, the difference is that a method for forming a pattern layer 333 on the ceramic body 331 can include the following steps.

A layer of thermo-sensitive ink is formed on a surface of the ceramic body 331 by printing, wherein different thermo-sensitive ink materials are printed in different areas. The ceramic body 331 printed with the thermo-sensitive ink is baked so that the thermo-sensitive ink is solidified to form a thermo-sensitive ink layer. The thermo-sensitive ink layer appears different patterns by removing a portion of the solidified thermo-sensitive ink layer through laser engraving. Therefore, the pattern layer 333 is formed.

In this exemplary embodiment, the pattern layer 333 includes a first pattern 3331, a second pattern 3332, a third pattern 3333, and a fourth pattern 3334. The first, second, third, and fourth pattern 3331, 3332, 3333, 3334 are different patterns and made of different thermo-sensitive ink materials configured for indicating different temperature sections. In this exemplary embodiment, the first pattern 3331 changes a color thereof corresponding to a first temperature section about 25-30° C., the second pattern 3332 changes a color thereof corresponding to a second temperature section about 30-40° C., the third pattern 3333 changes a color thereof corresponding to a third temperature section about 40-50° C., the fourth pattern 3334 changes a color thereof corresponding to a fourth temperature section about 50-60° C.

In other exemplary embodiment, the pattern 3330 can be directly formed printing, the step of laser engraving can be omitted.

In addition, while forming the multiple patterns (e.g. the first, second, third, and fourth patterns 3331 to 3334) are formed on the housing 33, the multiple embedding members 33 can be positioned in the base 31 corresponding to the patterns. Each pattern is formed on one of the embedding members 33.

The pattern layer 333 made of thermo-sensitive material can appear different colors corresponding to the temperature sections. Therefore, an user can determine the temperature of the electronic device 100 according to the colors of the pattern layer 333 in time and avoid the electronic device 100 to be overheat.

It is to be understood, however, that even through numerous characteristics and advantages of the present disclosure have been set forth in the foregoing description, together with details of assembly and function, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:
1. A housing comprising:
a base defining at least one receiving cavity; and at least one embedding member corresponding to the at least one receiving cavity, the at least one embedding member comprising:
- a ceramic body being embedded into the at least one receiving cavity and closely connected to the base; and
- a pattern layer formed on the ceramic body and protruding out of the receiving cavity, the pattern layer comprising at least one pattern having a color, wherein the at least one pattern is made of thermo-sensitive ink material, and the at least one pattern changes the color thereof according to changes of temperature.

2. The housing of claim 1, wherein the pattern layer comprises multiple different patterns, each pattern changes the color thereof corresponding to a temperature section.

3. The housing of claim 1, wherein the pattern layer comprises one pattern, the pattern appears different colors in different temperature sections.

4. The housing of claim 1, wherein a thickness of the at least one pattern is about 0.01-0.02mm.

5. The housing of claim 1, wherein the at least one embedding member further comprises a protective film formed on a surface of the pattern layer, the protective film is made of transparent or translucent UV type curing ink.

6. An electronic device, comprising:
- a window portion; and
- a housing assembled together with the window portion, the housing comprising:
  - a base defining at least one receiving cavity; and
  - at least one embedding member corresponding to the at least one receiving cavity, the at least one embedding member comprising:
    - a ceramic body being embedded into the at least one receiving cavity and closely connected to the base; and
    - a pattern layer formed on the ceramic body and protruding out of the receiving cavity, the pattern layer comprising at least one pattern, wherein the at least one pattern is made of thermo-sensitive ink material, and the at least one pattern changes the color thereof according to changes of temperature.

7. The electronic device of claim 6, wherein the pattern layer comprises multiple different patterns, each pattern changes the color thereof corresponding to a temperature section.

8. The electronic device of claim 6, wherein the pattern layer comprises one pattern, the pattern appears different colors in different temperature sections.

9. The electronic device of claim 6, wherein a thickness of the at least one pattern is about 0.01-0.02mm.

10. The electronic device of claim 6, wherein the at least one embedding member further comprises a protective film formed on a surface of the pattern layer, the protective film is made of transparent or translucent UV type curing ink.

* * * * *